United States Patent Office 2,918,453
Patented Dec. 22, 1959

2,918,453

DRY PREPARATIONS CAPABLE OF YIELDING CATION-ACTIVE MELAMINE RESIN SOLUTIONS BY DISSOLUTION IN WATER AND RIPENING AND PROCESS FOR THEIR MANUFACTURE

Gustav Widmer, Basel, Switzerland, assignor to Ciba Limited, Basel, Switzerland, a firm of Switzerland No Drawing. Application November 19, 1956
Serial No. 622,818

Claims priority, application Switzerland
November 24, 1955

9 Claims. (Cl. 260—67.6)

Aqueous solutions of cation-active melamine resins are finding increasing application for the treatment of textiles and paper, especially in the production of paper of improved wet strength. Solutions of this kind are usually prepared by dissolving a melamine resin in dilute hydrochloric acid and allowing the solution to ripen for several hours or days at a moderately raised temperature. For this purpose about 0.5 to 1.5 mols, and generally about 0.75 mol, of hydrochloric acid are required per mol of melamine resin. It is a great disadvantage to the finishing industries to handle concentrated hydrochloric acid and that the maintenance of the necessary conditions for ripening sometimes lead to manufacturing difficulties.

The present invention provides dry preparations which can be dissolved in aqueous media and ripened to yield cation-active solutions of melamine resins. These preparations comprise a hardenable condensation product of 1 molecular proportion of melamine with 2–6 molecular proportions, and advantageously 2–4 molecular proportions, of formaldehyde and in which condensation product there are bound about 0.5 to 1.5 molecular proportions, and advantageously about 1 molecular proportion, of a strong monobasic mineral acid, such as HCl or $HNO_3$.

The invention also provides a process for the manufacture of the aforesaid dry preparations, wherein an aqueous solution of the said melamine-formaldehyde condensation product containing the said proportion of acid is subjected to cautious drying, advantageously spray drying. If desired, the dried product produced by spray drying may be subjected to a further cautious drying operation, for example, by means of a powerful dehydrating agent, such as phosphorus pentoxide or concentrated sulfuric acid. By cautious drying dry preparations can be obtained which have a water content of at most 1 percent by weight and which are surprisingly resistant to storage.

The solution to be dried is advantageously prepared by condensing melamine with formaldehyde in alkaline solution and then adding the necessary proportion of mineral acid. Alternatively, a dry melamine-formaldehyde condensate or the components thereof may be dissolved in water, and the solution subjected to cautious drying, after the addition of the necessary proportion of mineral acid.

The dry preparations of this invention are white powders which are soluble in water or other aqueous media. Aqueous solutions of the dry preparations can be subjected directly to ripening or, if desired, previously brought by the addition of a hardenable melamine-formaldehyde condensate to the usual acid concentration of about 0.75 to 1.0 molecular proportion per molecular proportion of melamine.

The temperature of the water used for ripening varies depending on the solubility of the dry preparation. By increasing the temperature the ripening period can be shortened. The minimum ripening periods are, for example, as follows:

| | | |
|---|---|---|
| 20° C. | hours | 24 |
| 40° C. | do | 4 |
| 75° C. | minutes | 15 |
| 95° C. | do | 3 |

If the dry preparation is dissolved in warm water, and then the solution, if desired, after the addition of a hardenable melamine-formaldehyde condensate, is rapidly brought to the boil with steam, only a short period of boiling is required to complete the ripening. A cation-active melamine resin solution ready for use can thus directly be obtained by dissolving the dry preparation in a hot aqueous medium.

If desired, modifying additions may be mixed with the dry preparation, such as cane sugar, methyl-cellulose, dextrin, sorbitol, inorganic salts etc. Such additions may also be mixed with the aqueous solutions prior to drying.

Ripened aqueous solutions prepared with the dry preparations of this invention are just as suitable for use in the textile and paper industries as are the aqueous solutions of cation-active melamine resins hitherto used. For the finishing industries the solutions prepared with the dry preparations of this invention have the advantage that they can be prepared without the hazards which attend the handling of concentrated acids and that they can be ripened without difficulty.

The following examples illustrate the invention, the parts and percentages being by weight unless otherwise stated and the relationship of parts by weight to parts by volume being the same as that of the kilogram to the litre.

The "melamine resin solution" referred to in the examples is a solution of a melamine-formaldehyde condensate obtained as follows:

63 parts of melamine are introduced into 182 parts by volume of a formaldehyde solution containing 33 parts by weight of formaldehyde per 100 parts by volume of solution (ratio of melamine to formaldehyde=1:4), which solution is adjusted with caustic soda to a pH value of 8.5, and the whole is reacted in a boiling water bath until a test portion of 1 part by volume of resin solution mixed with 4 parts by volume of water produces a milky turbidity at 20° C., which is the case after about one hour and 10 minutes. The solution is cooled to 20° C., and contains about 47 percent of melamine and formaldehyde.

Example 1

247.8 parts of melamine resin solution are mixed with a mixture of 675 parts of water and 58 parts by volume of hydrochloric acid solution containing 37.2 parts by weight of HCl per 100 parts by volume of solution (density=1.16), which corresponds to 1.2 mol of HCl per mol of melamine, and the solution is then dried immediately or after being allowed to stand for a few hours in a spray drier in which the incoming air has a temperature of about 140° C. to yield a dry product having a water content of about 1 percent. There is obtained a snow white powder which dissolves easily in warm water.

2.36 parts of the dry preparation so obtained are dissolved in 22.8 parts of water, during which the mixture is heated to 60° C., and 0.76 part of a melamine resin, which contains about 3 mols of formaldehyde per mol of melamine, is strewn into the solution and dissolved therein. The solution can then be ripened in known manner. For example, immediately before use, it may be heated to 75° C., maintained at that temperature for 15 minutes, and then added, for example, directly to a paper pulp to be used in the manufacture of paper of improved wet strength.

Example 2

249 parts of melamine resin solution are diluted with a mixture of 600 parts of water and 74 parts by volume of hydrochloric acid solution containing 37.2 parts by weight of HCl per 100 parts by volume of solution, which corresponds to 1.5 mols of HCl per mol of melamine, and the whole is diluted with water to 987 parts by volume. The resulting solution contains about 12 parts by weight of melamine-formaldehyde condensate per 100 parts by volume of solution. The solution is dried in a spray drier in the manner described in Example 1, and there is obtained a snow white powder having a water content of about 1 percent. In this state it retains its complete solubility in water and usefulness for several days, even when stored at 60° C. By titration the melamine formaldehyde condensate has a content of hydrogen chloride of about 1.2 mols per mol of melamine (about 3.9 millilitres of 1 N-caustic soda solution per gram of substance, chlorine content=about 14 percent).

The dry product is dissolved in water as such, or with the addition of a melamine resin, which contains about 3 mols of formaldehyde per mol of melamine, and the solution is allowed to ripen at the desired temperature and used in known manner. By the addition of melamine resin the content of bound hydrogen chloride, which is 1.2 mol HCl per mol of melamine in the condensate, can be reduced to 1.0, 0.8 or 0.6 mol of HCl.

Example 3

125 parts of melamine resin solution are diluted with 300 parts of water, which contains 34.2 parts of nitric acid of 65.6 percent strength, which corresponds to about 1.5 mols of $HNO_3$ per mol of melamine resin, and the mixture is made up with water to 487 parts by volume. The solution is dried in a spray drier in the manner described in Example 1 and the dry powder is stored, if desired, over phosphorous pentoxide. The final product is a snow white powder which has a moisture content of less than 1 percent and has good storage qualities. By titration it is found that the content of nitric acid is 1.21 mol per mol of melamine.

A solution is prepared ready for use by dissolving 3.22 parts of the dry preparation, which contains 2.46 parts of melamine-formaldehyde condensate and 0.76 part of $HNO_3$, in 17 parts of hot water, making up the whole with water to 20 parts by volume, and allowing the resulting solution to ripe for 15 minutes at 75° C.

What I claim is:

1. A substantially dry preparation capable of yielding a cation-active melamine resin solution by dissolution in water and ripening, which preparation consists essentially of a hardenable condensation product of one molecular proportion of melamine with 2 to 6 molecular proportions of formaldehyde an about 0.5 to 1.5 molecular proportions of a strong monobasic mineral acid selected from the group consisting of hydrochloric acid and nitric acid per one molecular proportion of melamine.

2. A substantially dry preparation capable of yielding a cation-active melamine resin solution by dissolution in water and ripening, which preparation consists essentially of a hardenable condensation product of one molecular proportion of melamine with 2 to 4 molecular proportions of formaldehyde and about 0.5 to 1.5 molecular proportions of a strong monobasic mineral acid selected from the group consisting of hydrochloric acid and nitric acid per one molecular proportion of melamine.

3. A substantially dry preparation capable of yielding a cation-active melamine resin solution by dissolution in water and ripening, which preparation consists essentially of a hardenable condensation product of one molecular proportion of melamine with 2 to 4 molecular proportions of formaldehyde and about one molecular proportion of a strong monobasic mineral acid selected from the group consisting of hydrochloric acid and nitric acid per one molecular proportion of melamine.

4. A substantially dry preparation as claimed in claim 1 which has a water content not exceeding 1 percent.

5. A substantially dry preparation as claimed in claim 2 which has a water content not exceeding 1 percent.

6. A substantially dry preparation as claimed in claim 3 which has a water content not exceeding 1 percent.

7. A process for the manufacture of a substantially dry preparation capable of yielding a cation-active melamine resin solution by dissolution in water and ripening, wherein there is subjected to spray drying an aqueous solution of a hardenable condensation product of one molecular proportion of melamine with 2 to 6 molecular proportions of formaldehyde and of about 0.5 to 1.5 molecular proportions of a strong monobasic mineral acid selected from the group consisting of hydrochloric acid and nitric acid per one molecular proportion of melamine.

8. A process for the manufacture of a substantially dry preparation capable of yielding a cation-active melamine resin solution by dissolution in water and ripening, wherein there is subjected to spray drying an aqueous solution of a hardenable condensation product of one molecular proportion of melamine with 2 to 4 molecular proportions of formaldehyde and of about 0.5 to 1.5 molecular proportions of a strong monobasic mineral acid selected from the group consisting of hydrochloric acid and nitric acid per one molecular proportion of melamine.

9. A process for the manufacture of a substantially dry preparation capable of yielding a cation-active melamine resin solution by dissolution in water and ripening, wherein there is subjected to spray drying an aqueous solution of a hardenable condensation product of one molecular proportion of melamine with 2 to 4 molecular proportions of formaldehyde and of about one molecular proportion of a strong monobasic mineral acid selected from the group consisting of hydrochloric acid and nitric acid per one molecular proportion of melamine.

References Cited in the file of this patent

UNITED STATES PATENTS

| 2,345,543 | Wohnsiedler et al. | Mar. 28, 1944 |
| 2,368,451 | D'Alelio | Jan. 30, 1945 |
| 2,466,744 | Scott | Apr. 12, 1949 |
| 2,523,477 | Nagy | Sept. 26, 1950 |

FOREIGN PATENTS

| 587,354 | Great Britain | Apr. 23, 1947 |